United States Patent [19]

Takahashi

[11] Patent Number: 5,510,916
[45] Date of Patent: Apr. 23, 1996

[54] ACTIVE MATRIX LIQUID CRYSTAL DEVICE WITH OPPOSITE SUBSTRATE HAVING BLACK MATRIX WITH LARGER APERTURE THAN ACTIVE SUBSTRATE

[75] Inventor: Nobuo Takahashi, Tokyo, Japan

[73] Assignee: NEC Corporation, Tokyo, Japan

[21] Appl. No.: 143,738

[22] Filed: Nov. 1, 1993

[30] Foreign Application Priority Data

Oct. 30, 1992 [JP] Japan .................................. 4-292850
Jun. 23, 1993 [JP] Japan .................................. 5-151764

[51] Int. Cl.$^6$ ........................... G02F 1/133; G02F 1/1343
[52] U.S. Cl. ................................. 359/67; 359/59
[58] Field of Search ............................. 359/58, 59, 87, 359/67

[56] References Cited

U.S. PATENT DOCUMENTS

| | | | |
|---|---|---|---|
| 4,733,948 | 3/1988 | Kitahara ................................... | 350/339 |
| 4,759,610 | 7/1988 | Yanagisawa .............................. | 359/79 |
| 4,789,223 | 12/1988 | Kasahara et al. ........................ | 359/59 |
| 5,299,041 | 3/1994 | Morin et al. ............................. | 359/67 |
| 5,339,181 | 8/1994 | Kim et al. ................................ | 359/67 |

FOREIGN PATENT DOCUMENTS

| | | |
|---|---|---|
| 0136509 | 4/1985 | European Pat. Off. . |
| 0524067 | 1/1993 | European Pat. Off. . |
| 60-120321 | 6/1985 | Japan ................................... 359/67 |
| 1-266512 | 10/1989 | Japan . |
| 2-13927 | 1/1990 | Japan . |
| 3-125123 | 5/1991 | Japan ................................... 359/79 |
| 3-239229 | 10/1991 | Japan ................................... 359/87 |

OTHER PUBLICATIONS

JM. Vignolle et al., "Optimisation of Very Small Pitch Active Matrix LCD for Projection", 1991 International Display Research Conference, (91CH3091-8) pp. 223-226.
Patent Abstracts of Japan, vol. 010, No. 068, Mar. 18, 1986 (JPA 60-207116).
Patent Abstracts of Japan, vol. 017, No. 175, Apr. 5, 1993, (JPA 04-331924).
M. Tsumura et al., "High-Resolution 10.3-in. Diagonal Multicolor TFT-LCD", *SID International Symposium—Digest of Technical Papers*, 1991, Playa Del Rey, pp. 215-218.

Primary Examiner—William L. Sikes
Assistant Examiner—Kenneth Parker
Attorney, Agent, or Firm—Sughrue, Mion, Zinn, Macpeak & Seas

[57] ABSTRACT

In an active matrix liquid crystal device assuming a light blocking condition when a voltage is applied, there are provided a main plate formed with a pixel electrode, wiring electrodes and a switching transistor, an opposing plate formed with an opposing electrode, and a liquid crystal material sandwiched between the main plate and the opposing plate, so that a transmission light is irradiated from the main plate side. A light blocking layer acting also as a storage capacitor electrode is provided on the main plate through an insulating layer under the wiring electrode, the switching device and a periphery of the pixel electrode. Thus, it is to prevent light leakage at a boundary of a pixel, and to simultaneously suppress and conceal an orientation abnormality of the liquid crystal occurring at a periphery of the pixel electrode.

3 Claims, 4 Drawing Sheets

ACTIVE MATRIX LIQUID CRYSTAL DEVICE WITH OPPOSITE SUBSTRATE HAVING BLACK MATRIX WITH LARGER APERTURE THAN ACTIVE SUBSTRATE

BACKGROUND OF THE INVENTION

1. Field of the Invention

The present invention relates to a liquid crystal device, and more specifically, a transmission type active matrix liquid crystal device.

2. Description of Related Art

Liquid crystal devices are energetically researched and developed as display apparatuses and light modulation devices. At present, a direct-viewing type display apparatuses using the liquid crystal devices are widely used, and the liquid crystal devices have been incorporated into projection type display apparatuses and printer heads.

In general, the liquid crystal device is fundamentally formed of a pair of electrode plates opposing to each other, and a liquid crystal material sandwiched between the pair of electrode plates. In a liquid crystal device including a plurality of pixels, the electrodes formed on one of the pair of electrode plates are, in many cases, different in size from those formed on the other electrode plate. Particularly, in a liquid crystal device including switching devices such as a TFT (thin film transistor), the switching devices and pixel electrodes connected thereto are formed on one of the pair of electrode plates (main plate), and a common opposing electrode is formed on the whole of the other electrode plate (opposing plate).

FIG. 1A illustrates, in an enlarged scale, one pixel portion of a main plate of a conventional active matrix liquid crystal display apparatus, and FIG. 1B shows a sectional view taken along the line C—C in FIG. 1A in the same liquid crystal display apparatus. In these figures, Reference Numeral 301 designates a main glass plate, and Reference Numeral 302 shows a scan line. Reference Numeral 303 indicates a signal line. Reference Numeral 305 is given to a switching device such as TFT (thin film transistor). Reference Numeral 306 designates a pixel electrode, and Reference Numeral 308 is an opposing glass plate. Reference Numeral 309 shows an opposing electrode. Reference Numeral 310 indicates an inter-pixel light blocking layer, and Reference Numeral 311 is an aligning film. Reference Numeral 312 designates a liquid crystal layer.

In this liquid crystal display apparatus, the transparent pixel electrode 306 and the transparent opposing electrode 309 are formed on the main plate 301 and the opposing plate 308, respectively, and furthermore, the aligning films 311 are formed on the transparent pixel electrode 306 and the transparent opposing electrode 309, respectively. A twisted nematic liquid crystal material 312 is sandwiched between these aligning films 311.

This type of liquid crystal display apparatus is ordinarily used in a so-called "normally white mode", in which when no driving voltage is applied to the liquid crystal, the liquid crystal permits transmission of light, and when a driving voltage is applied to the liquid crystal, the liquid crystal blocks transmission of light. In this type of liquid crystal display apparatus, however, since it is not possible to control the liquid crystal in an region between the pixel electrodes 306, it is not possible to elevate the lightness/darkness ratio of an overall display screen. In addition, at a periphery of the pixel electrode 306, a direction of the electric field becomes out of perpendicular to the electrode, abnormal orientation such as disclination occurs in the liquid crystal layer, which becomes a cause of display defective such as image sticking and afterimage.

Under this circumstance, there has been ordinarily provided a light block layer in a pixel boundary area. Generally, as shown in FIG. 1B, the inter-pixel light blocking layer 310 is provided on the opposing plate 308, so as to conceal from a pixel aperture portion the pixel boundary area and its neighbor zone where the transmission light cannot be controlled. In addition, since it is known that the disclination occurs particularly in a region depending upon an initial orientation direction determined by a rubbing direction and a direction of an applied electric field, it has been proposed that the inter-pixel light blocking layer 310 is extended to cover an area in which the above mentioned orientation abnormality is apt to easily appear (Japanese Patent Publication JP-A-01-266512). Alternatively, it has been also proposed that the pixel electrode 306 is extended (Japanese Patent Publication JP-A-02-013927). With these means, the area in question is concealed in particular.

Furthermore, as shown in FIG. 2, a storage capacitor electrode 407 provided under a pixel electrode 406 is formed to extend along a periphery of the pixel electrode so as to improve a pixel aperture ratio (Japanese Patent Publication JP-A-03-239229). Incidentally, in FIG. 2, Reference Numeral 402 designates a scan line, and Reference Numeral 403 shows a signal line. Reference Numeral 405 indicates a switching device such as TFT.

As mentioned above, the orientation abnormality of the liquid crystal occurs at the periphery of the pixel electrode. In this areas, however, it is not possible to control the transmission light. Therefore, if the orientation abnormality of the liquid crystal occurs within the pixel aperture, the display is affected by the above mentioned adverse influence. Since the liquid crystal device of the normally white mode is configured to block light when a voltage is applied, it is difficult to enlarge the aperture area to the size of the pixel electrode. On the other hand, in the case that the inter-pixel light blocking layer is provided on the opposing plate, an extended margin corresponding the amount of misalignment which would occur when the pair of plates are coupled to each other as shown in FIG. 1B, becomes necessary. In this case, an angle of field in relation to the pixel electrode must be considered, and therefore, the area of the aperture must be greatly reduced in comparison with the area of the pixel electrode.

To minimize the amount of misalignment, if a high precision of alignment is required in the process of bonding the pair of plates, the manufacturing process becomes correspondingly difficult. Since the liquid crystal device incorporated in the projection type display apparatus does not require to consider the angle of field, it becomes unnecessary to lower the aperture ratio by the amount corresponding to the fact that it is not necessary to consider the angle of field. However, in order to miniaturize the whole of the plate, an interval between the pixel electrodes is shortened, so that interaction between the electrodes becomes liable to occur, with the result that the orientation abnormality of the liquid crystal easily occurs within the pixel.

If the aperture area of the pixel is reduced so as to lower the aperture ratio, the power consumption increases, or alternatively, the interval between the pixel apertures becomes effectively large. These leads to deterioration of the image quality.

Under the above mentioned circumstance, there is demanded a means capable of ensuring the aperture ratio without extremely increasing the precision of alignment in the plate bonding and without lowering the image quality.

When the inter-pixel light blocking layer is provided on the main plate, since the precision of alignment of the light blocking layer to the pixel electrode can be determined by the precision of photolithography, it is possible to easily obtain a high precision. Therefore, it becomes unnecessary to reduce the aperture while considering the misalignment of the plates and the angle of field. However, if a lateral electric field is applied between the inter-pixel light blocking layer and the pixel applied with a saturation voltage, the orientation abnormality of the liquid crystal occurs on the pixel electrode.

In the case that the light blocking layer 407 is provided under the periphery of the pixel electrode 406 in a positional relation as shown in FIG. 2, it is possible to conceal the orientation abnormality of the liquid crystal. However, in order to reduce an overlapping between the wiring electrodes 402 and 403 and the storage capacitor electrode 407, the light blocking layer is realized in the form of a closed loop so as to be positioned only the periphery of the pixel electrode. This causes the following disadvantages:

First, since a gap occurs between the wiring electrodes and the storage capacitor electrode, a light block layer for concealing the gap has to be provided on the opposing plate. In addition, the storage capacitor electrode 407 is required to be formed in the shape of a narrow width band, it is difficult to narrow the electrode because of restriction attributable to an electric resistance and a pattern forming process, and therefore, it is not possible to so enlarge the area of the aperture. Even if the electrode were narrowed, since the light blocking layer of the opposing plate can have only a margin for misalignment corresponding to the width of the storage capacitor electrode, a high precision of alignment is still required in order to increase the aperture ratio.

In the case that the light blocking is necessary because the switching device is sensitive to light, another problem occurs. In the structure shown in FIG. 2, since the wiring electrode or another on a plate opposite to a light incident plate is viewed within the aperture regardless of whether light is incident to either the main plate or the opposing plate, the incident light is reflected by the wiring electrode, so that the light passes into the switching device, with the result that the characteristics of the switching device is deteriorated.

SUMMARY OF THE INVENTION

Accordingly, it is an object of the present invention to provide a transmission type active matrix liquid crystal device which has overcome the above mentioned defect of the conventional one.

Another object of the present invention is to provide a transmission type active matrix liquid crystal device having an elevated performance of the liquid crystal device, by preventing light leakage in the pixel electrode and to simultaneously conceal the orientation abnormality of the liquid crystal occurring at the periphery of the pixel electrode, without reducing the pixel aperture more than the degree required, and without requiring a high precision of alignment in the process of bonding the plates.

The above and other objects of the present invention are achieved in accordance with the present invention by an active matrix liquid crystal device comprising a main plate formed with a pixel electrode, a wiring electrode and a switching device, an opposing plate formed with an opposing electrode, and a liquid crystal material sandwiched between the main plate and the opposing plate, so that a transmission light is irradiated from the main plate side, the active matrix liquid crystal device being characterized in that a light blocking layer acting also as a storage capacitor electrode is provided on the main plate through an insulating layer under the wiring electrode, the switching device and a periphery of the pixel electrode.

In the case that the switching device is sensitive to light, on the opposing plate there is preferably provided a light blocking layer having an area necessary to cover the switching device, and the light blocking layer provided on the main plate is larger than the light blocking layer provided on the opposing plate by a maximum mount of misalignment between the main plate and the opposing plate.

The above and other objects, features and advantages of the present invention will be apparent from the following description of preferred embodiments of the invention with reference to the accompanying drawings.

DESCRIPTION OF THE PREFERRED EMBODIMENTS

First Embodiment

Figures 1A, 1B:
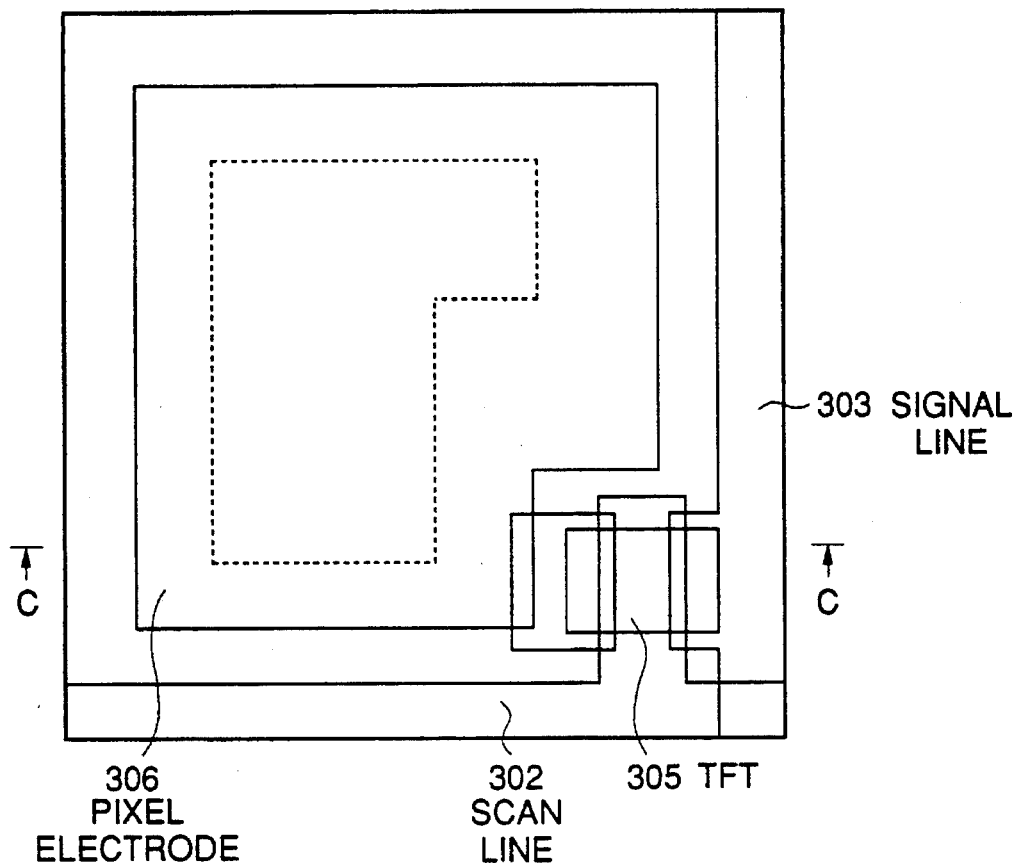
FIG. 1A is a diagrammatic plan view illustrating one pixel section of one example of the conventional liquid crystal device.
FIG. 1B is a diagrammatic sectional view taken along the line C—C in FIG. 1A.
Figure 2:
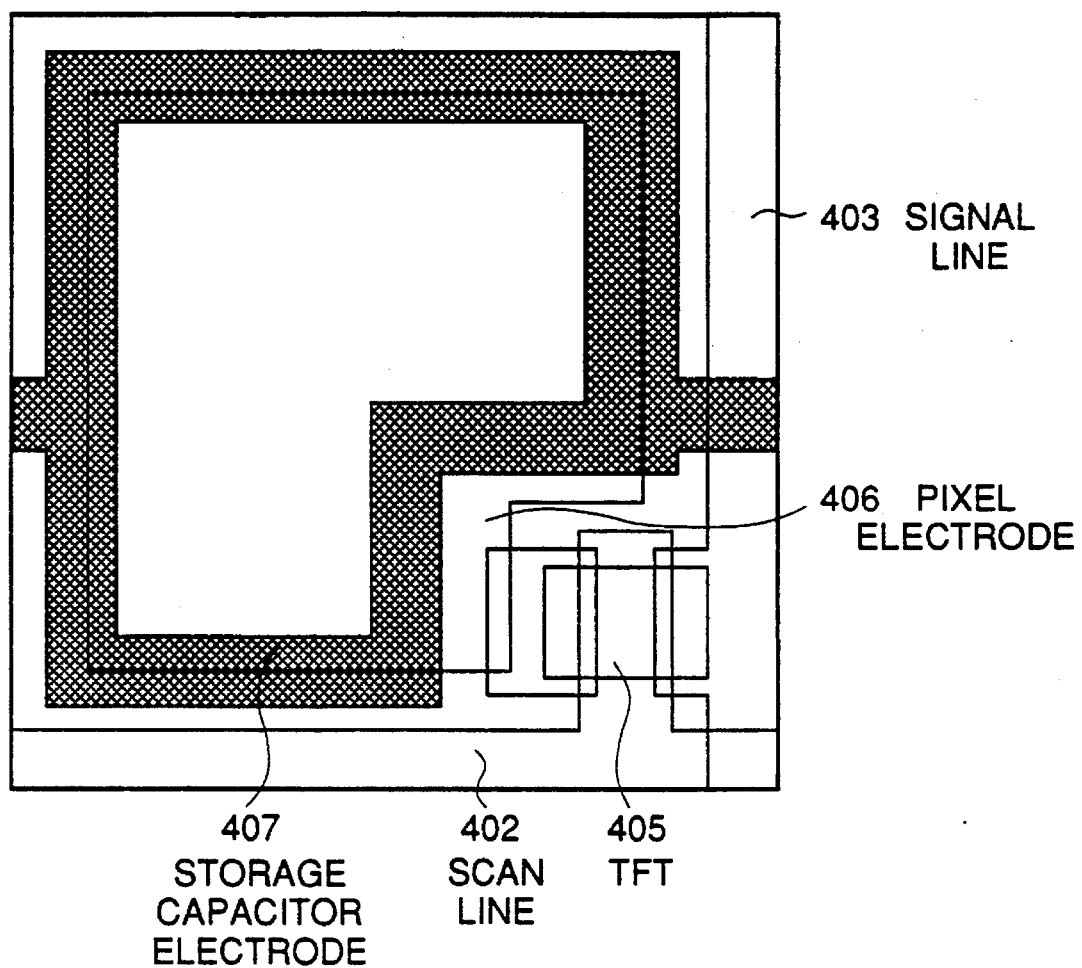
FIG. 2 is a diagrammatic plane view illustrating one pixel section of another example of the conventional liquid crystal device.
Figure 3A:
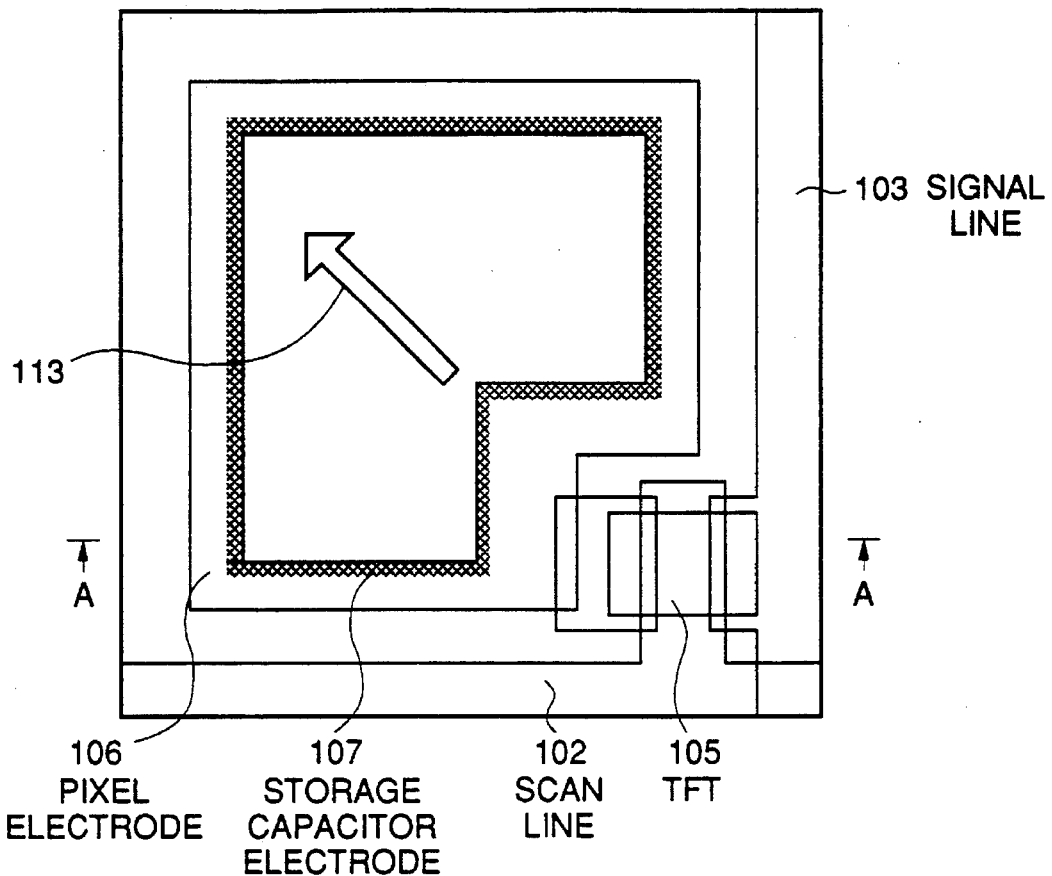
FIG. 3A is a diagrammatic plan view illustrating one pixel section of one embodiment of the active matrix liquid crystal device in accordance with the present invention.
Figure 3B:
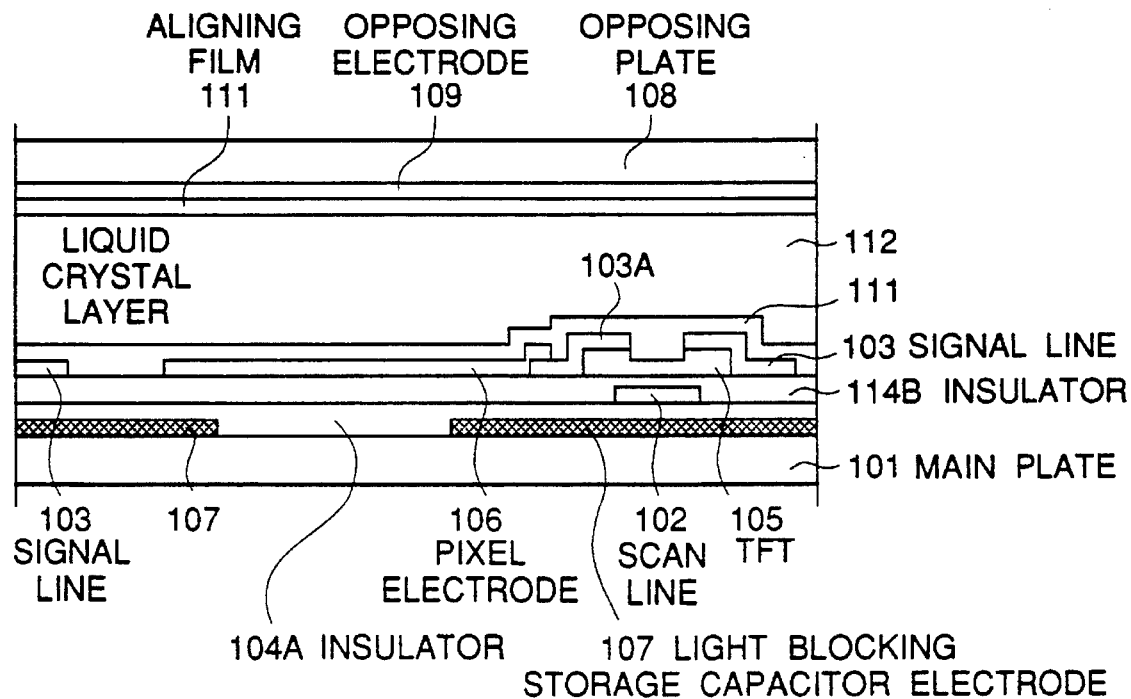
FIG. 3B is a diagrammatic sectional view taken along the line A—A in FIG. 3A.

Referring to FIG. 3A, there is shown an enlarged view of one pixel section on a main plate in one embodiment of the liquid crystal display apparatus using a TFT and constructed in accordance with the present invention, and FIG. 3B is a sectional view taken along the line A—A in FIG. 3A of the liquid crystal display apparatus composed of a main plate, an opposing plate and a liquid crystal material.

On a glass plate 101 forming the main plate, a storage capacitor electrode 107 formed of chromium acting as an inter-pixel light blocking layer was deposited, and an insulating layer 104A was deposited to cover the storage capacitor electrode 107 and all the surface of the main plate that is not covered with the storage capacitor electrode 107. On this insulating layer 104A, a scan line 102 formed of chromium was deposited, and another insulating layer 104B was deposited to cover the scan line 102 and the insulating layer 104A. On this insulating layer 104B, a TFT (thin film transistor) switching device 105 formed of amorphous silicon, a signal line 103 and a source/drain electrode 103A formed of chromium, and a transparent pixel electrode 106 formed of ITO (indium tin oxide) were formed as shown. In this arrangement, the layer 105 formed of amorphous silicon forms a channel region of the TFT, and the scan line 102 forms a gate electrode. In addition, the signal line 103 and a portion of the source/drain electrode 103A overlapping with the layer 105 formed of amorphous silicon, form a source electrode and a drain electrode, respectively, or a drain electrode and a source electrode, respectively. Thus, by controlling a voltage applied to the scan line 102, the TFT can be selectively turned on so that a voltage on the signal line 103 can be supplied to the pixel electrode 106.

On another glass plate 108 forming the opposing plate, an opposing electrode 109 formed of ITO was deposited.

The storage capacitor electrode 107 has a portion overlapping with a periphery of the pixel electrode 106, and particularly, the width of the overlapping portion of the storage capacitor electrode 107 was widened in a special area determined on the basis of a rubbing direction by paying attention to generation of disclination.

A polyimide aligning film 111 was coated to cover all of the TFT switching device 105, the signal line 103, the source/drain electrode 103A, and the transparent pixel electrode 106, and another aligning film 111 was coated to cover the opposing electrode 109. Then, the polyimide aligning film 111 were baked. A rubbing treatment was performed on the plates thus treated so that when the plates are coupled to each other, the orientation direction of each plate becomes substantially perpendicular to that of the other plate. Thereafter, the plates were coupled to each other in such a manner that a spacing of about 5 μm was formed between the plates, and a TN (twisted nematic) liquid crystal material 112 was injected into the spacing between the plates. Then, the plates were encapsulated. Thus, a liquid crystal display apparatus was obtained.

Incidentally, in FIG. 3A, an arrow 113 indicates the rubbing direction of the main plate.

In the liquid crystal display apparatus thus obtained, a display was performed in the normally white mode while irradiating light from the main plate side and observing the display apparatus from the opposing plate side. When a voltage was applied, no orientation abnormality of the liquid crystal was observed. In the case of a pixel pitch of 65 μm, a clear image having the aperture ratio of not less than 40% and the lightness/darkness ratio of not less than 100:1 could be easily realized. This demonstrate an advantage of the present invention.

For comparison, a liquid crystal display apparatus having a conventional structure was prepared, and tested. In the case of the aperture ratio of 35%, the lightness/darkness ratio was not greater than 10:1. In order to obtain the lightness/darkness ratio of 100:1, it was necessary to drop the aperture ratio to 15% or less.

In the above mentioned first embodiment, as shown in FIG. 3B, since the light blocking storage capacitor electrode 107 is provided on the main plate 101, it is possible to determine alignment between the light blocking storage capacitor electrode 107 and the pixel electrode 106 by a photolithography process, and therefore, a high precision of alignment can be easily obtained. In addition, since the light blocking storage capacitor electrode 107 is located even under the wiring lines and electrodes, there becomes no gap between the light blocking storage capacitor electrode 107 and the wiring lines and electrodes, and therefore, it becomes unnecessary to providing a light blocking layer for concealing any gap between the storage capacitor electrode and the wiring lines and electrodes. Therefore, even if the precision of alignment between the main plate and the opposing electrode is not so elevated, it is possible to increase the aperture ratio. Furthermore, since the light blocking layer 107 can have a sufficiently large width, the electric resistance can be made small, and it is easy to form a pattern. Incidentally, since it is known that disclination is liable to occur in the pixel electrode at a side where a rubbing starts on the main plate, the light blocking effect can be enhanced by widening an overlapping width in that portion. In addition, since no light blocking layer is provided on the opposing plate 108, a high precision of alignment is not required in the process of bonding the plates to each other, and therefore, the manufacturing process becomes easy.

Second Embodiment

Figure 4A:
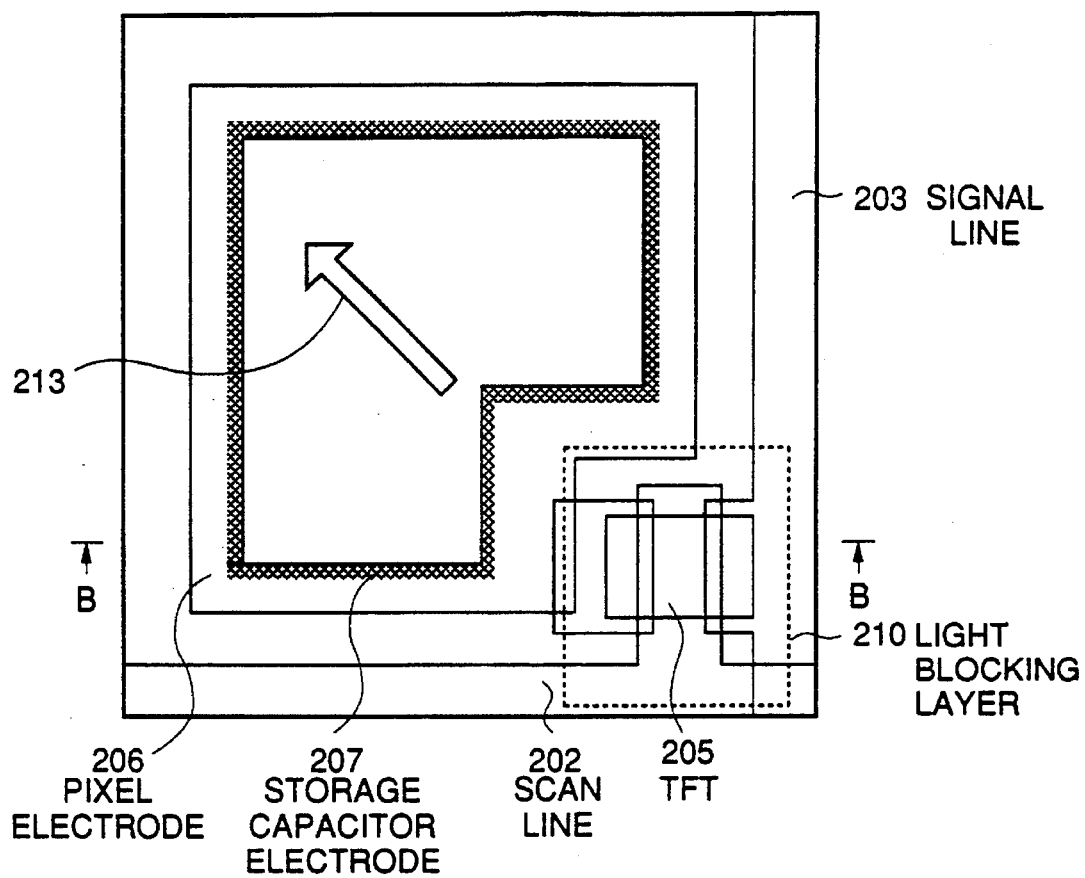
FIG. 4A is a diagrammatic plan view illustrating one pixel section of another embodiment of the active matrix liquid crystal device in accordance with the present invention.
Figure 4B:
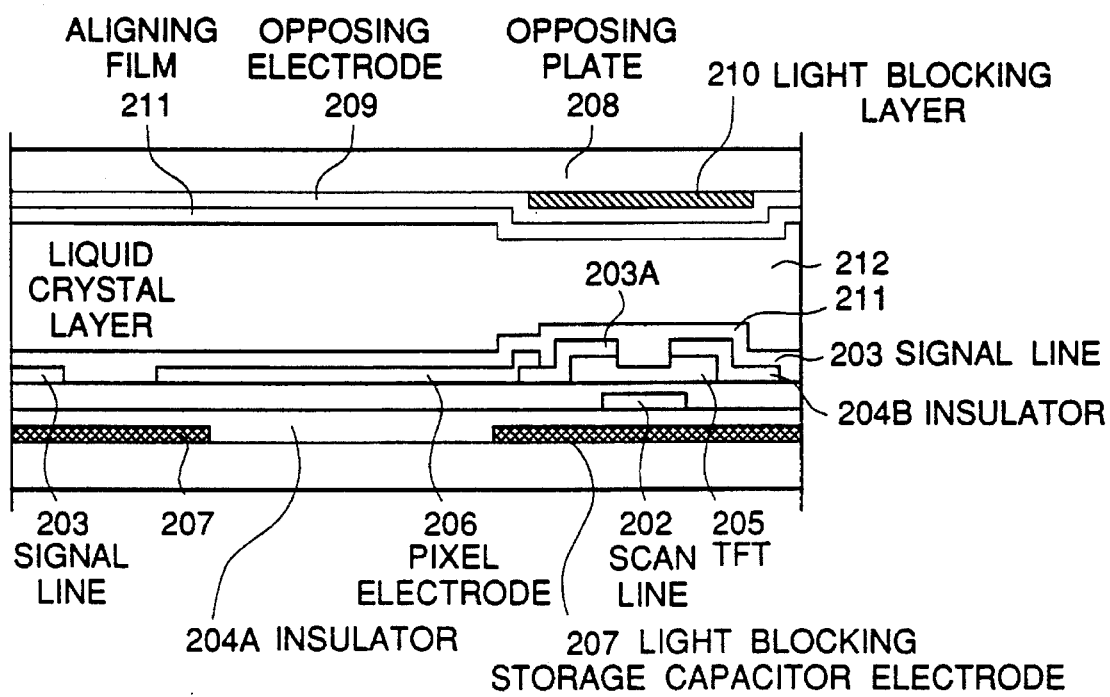
FIG. 4B is a diagrammatic sectional view taken along the line B—B in FIG. 4A.

Referring to FIG. 4A, there is shown an enlarged view of one pixel section on a main plate in another embodiment of the liquid crystal display apparatus in accordance with the present invention, and FIG. 4B is a sectional view of the liquid crystal display apparatus taken along the line B—B in FIG. 4A. In FIGS. 4A and 4B, elements similar or corresponding to those shown in FIGS. 3A and 3B are given Reference Numerals obtained by adding "100" to Reference Numerals given to the corresponding elements shown in FIGS. 3A and 3B. Therefore, a detailed explanation of the same elements as those shown in FIGS. 3A and 3B will be omitted.

In brief, on a main glass plate 201, a scan line 202 and a signal line 203 formed of chromium, a TFT 205 formed of amorphous silicon, and a pixel electrode 206 formed of ITO were formed, and a storage capacitor electrode 207 formed of chromium acting as a light blocking layer was formed through an insulating layer 204. On another glass plate 208 forming the opposing plate, an opposing electrode 209 formed of ITO and a light blocking layer 210 formed of chromium were deposited.

The light-blocking layer 210 has a configuration and size capable of covering the TFT 205 even if misalignment between the two plates becomes a maximum, and on the other hand, the storage capacitor electrode 207 has a configuration and size capable of ensuring that the light-blocking layer 210 never becomes visible within the pixel aperture even if misalignment between the two plates becomes a maximum. Similarly to the first embodiment, the storage capacitor electrode 207 has a portion overlapping with a periphery of the pixel electrode 206, and particularly, the width of the overlapping portion of the storage capacitor electrode 207 was widened in a special area determined on the basis of a rubbing direction.

A polyimide aligning film 211 was coated on a surface of each of the plates, and then baked. A rubbing treatment was performed on the plates thus treated so that when the plates are coupled to each other, the orientation direction of each plate becomes substantially perpendicular to that of the other plate. Thereafter, the plates were coupled to each other in such a manner that a spacing of about 5 μm was formed between the plates, and a TN liquid crystal material 212 was injected into the spacing between the plates. Then, the plates were encapsulated. Thus, a liquid crystal display apparatus was obtained.

Incidentally, in FIG. 4A, an arrow 213 indicates the rubbing direction of the main plate.

In the liquid crystal display apparatus thus obtained, a display was performed in the same conditions as those for the first embodiment. In the case of a pixel pitch of 65 μm, a clear image having the aperture ratio of not less than 35% and the lightness/darkness ratio of not less than 200:1 could be easily realized. In addition, this liquid crystal display apparatus was incorporated into a projection type optical system so that an enlarged image is projected in magnification of about 25 times. In this case, an image having a sufficient bright and excellent visibility could be obtained.

In this second embodiment, since the switching device 205 is sensitive to light, the light blocking layer 210 is provided on the opposing plate in order to prevent the switching device 205 from being exposed to light. However, since it is not necessary to provide a light blocking between pixels, the area of the light blocking layer 210 can be limited to a necessary minimum extent corresponding to the switching device 205.

In the case of a maximum amount of misalignment between the main and opposing plates, a high precision bonding of the plates becomes unnecessary by determining the shape of the light blocking storage capacitor electrode 207 so that the light blocking layer 210 never overlaps the pixel aperture. Since the light blocking storage capacitor electrode 207 determining the shape of the pixel aperture is provided on the main plate, similarly to the first embodiment, it is possible to perform at a high degree of precision alignment between the pixel electrode 206 and the light blocking storage capacitor electrode 207. Accordingly, it is not necessary to greatly narrow the pixel aperture.

When this liquid crystal device is viewed from a side of the main plate, the pattern on the opposing plate is not visible within the aperture. Therefore, when light is irradiated from the main plate side, the characteristics of the switching device is never deteriorated.

With the above mentioned actions, it is possible to elevate a light utilization efficiency in the liquid crystal device, without dropping the lightness/darkness ratio and the light blocking performance and without increasing the alignment precision in comparison with prior art.

In the above mentioned embodiments, chromium was used as the electrode material for the scan line, the signal line and the storage capacitor electrode. However, the electrode material is in no way limited to chromium, and any material having a light blocking property and an electrical conductivity, for example, aluminum and molybdenum, can be used. In addition, the material for the pixel electrode and the opposing electrode is not limited to ITO, but any light transparent electrical conductive material can be used. Furthermore, the material for the switching device is not limited to the amorphous silicon, but other material such as a polycrystalline silicon can be used. These are a matter of course.

In the structure in accordance with the present invention, since the scan line and the signal line overlap with the storage capacitor electrode, it would be feared that a large coupling capacitance occurring between these lines and the storage capacitor electrode will cause distortion of a waveform of a signal on the lines, and possibility of short-circuiting of the lines caused due to defects in the insulating layer between the electrodes will increase. Under this circumstance, in order to reduce this risk, it was the conventional practice to adopt a structure in which the line does not overlap the other electrode to a possible maximum extent. However, since this structure is not adopted in the present invention, it was confirmed in what degree the above mentioned risk becomes an actual problem. As a result, the distortion of the signal waveform which would be caused by the capacitive coupling, become no problem, if, in a liquid crystal panel having a diagonal size of not greater than 6 inches, the insulating layer is formed of a silicon oxide or silicon nitride thin film having the thickness not less than 3000 Å. In the liquid crystal panel having a diagonal size of greater than 6 inches, the distortion of the signal waveform can be suppressed to a not-problem level by using aluminum as a wiring material for the purpose of decreasing the wiring resistance. The possibility of short-circuiting of the lines caused due to defects in the insulating layer can be avoided by growing the insulating layer to the above mentioned thickness by a plurality of separate depositing processes In the above mentioned description, the present invention has been explained in connection with the display apparatus. However, the advantage of the present invention is not limited to the display apparatus, and the present invention can be advantageously applied to other devices utilizing a light modulation effect of the liquid crystal, for example, a printer head, or an image sensor.

As mentioned above, according to the present invention, it becomes possible, in the liquid crystal device having the switching device, to suppress the orientation abnormality of the liquid crystal occurring at the periphery of the pixel electrode so as to prevent the light leakage at the boundary of the pixel, without narrowing the pixel aperture and with a high precision of alignment. This enables to realize a high quality display without decreasing the light utility efficiency in the liquid crystal device. In particular, this is effective in miniaturizing the liquid crystal display apparatus with a high density.

The invention has thus been shown and described with reference to the specific embodiments. However, it should be noted that the present invention is in no way limited to the details of the illustrated structures but changes and modifications may be made within the scope of the appended claims.

I claim:

1. An active matrix liquid crystal device comprising:

a transparent main plate having at least one transparent pixel electrode, one wiring electrode and one switching device, which are formed on an inside surface of said transparent main plate;

a transparent opposing plate having a transparent opposing electrode formed on an inside surface of said opposing plate; and a liquid crystal material sandwiched between said inside surface of said main plate and said inside surface of said opposing plate, so that a transmission light is irradiated from the main plate side, said main plate including a light blocking layer which is formed on said inside surface of said main plate and which is covered by an insulating layer on which said wiring electrode, said switching device and the entire periphery of said pixel electrode are formed, said light blocking layer acting as one electrode of a storage capacitor, wherein said switching device is sensitive to light, and wherein said opposing plate has a light blocking layer 210 formed on said inside surface of said opposing plate at a position corresponding to said switching device of said main plate, said light blocking layer of said opposing plate having an area necessary to completely cover said switching device, and said light blocking layer provided on said main plate having a larger surface area per pixel than said light blocking layer provided on said opposing plate.

2. An active matrix liquid crystal device claimed in claim 1, wherein said light blocking layer of said opposing plate has a sufficient configuration and size capable of covering said switching device even if misalignment in plan view between said main plate and said opposing plate is large and said light blocking layer of said main plate has a sufficient configuration and size capable of ensuring that said light blocking layer of said opposing plate never becomes visible within a pixel aperture even if misalignment in plan view between said main plate and said opposing plate is large.

3. An active matrix liquid device comprising:

a transparent main plate having at least one transparent pixel electrode, one wiring electrode and one switching device, which are formed on an inside surface of said transparent main plate;

a transparent opposing plate having a transparent opposing electrode formed on an inside surface of said opposing plate; and a liquid crystal material sandwiched between said inside surface of said main plate and said inside surface of said opposing plate, so that a transmission light is irradiated from the main plate side, said main plate including a light blocking layer which is formed on said inside surface of said main plate and which is covered by an insulating layer on which said wiring electrode, said switching device and said pixel electrode are formed, said light blocking layer covering the entire periphery of said pixel electrode and acting as one electrode of a storage capacitor;

said switching device is sensitive to light, said opposing plate has a light blocking layer formed on said inside surface of said opposing plate at a position corresponding to said switching device of said main plate, said light blocking layer of said opposing plate has a sufficient configuration and size capable of covering said switching device even if misalignment in plan view between said main plate and said opposing plate is large, and said light blocking layer of said main plate has a sufficient configuration and size capable of ensuring that said light blocking layer of said opposing plate never becomes visible within a pixel aperture even if misalignment in plan view between said main plate and said opposing plate is large.

* * * * *